Figure 1:
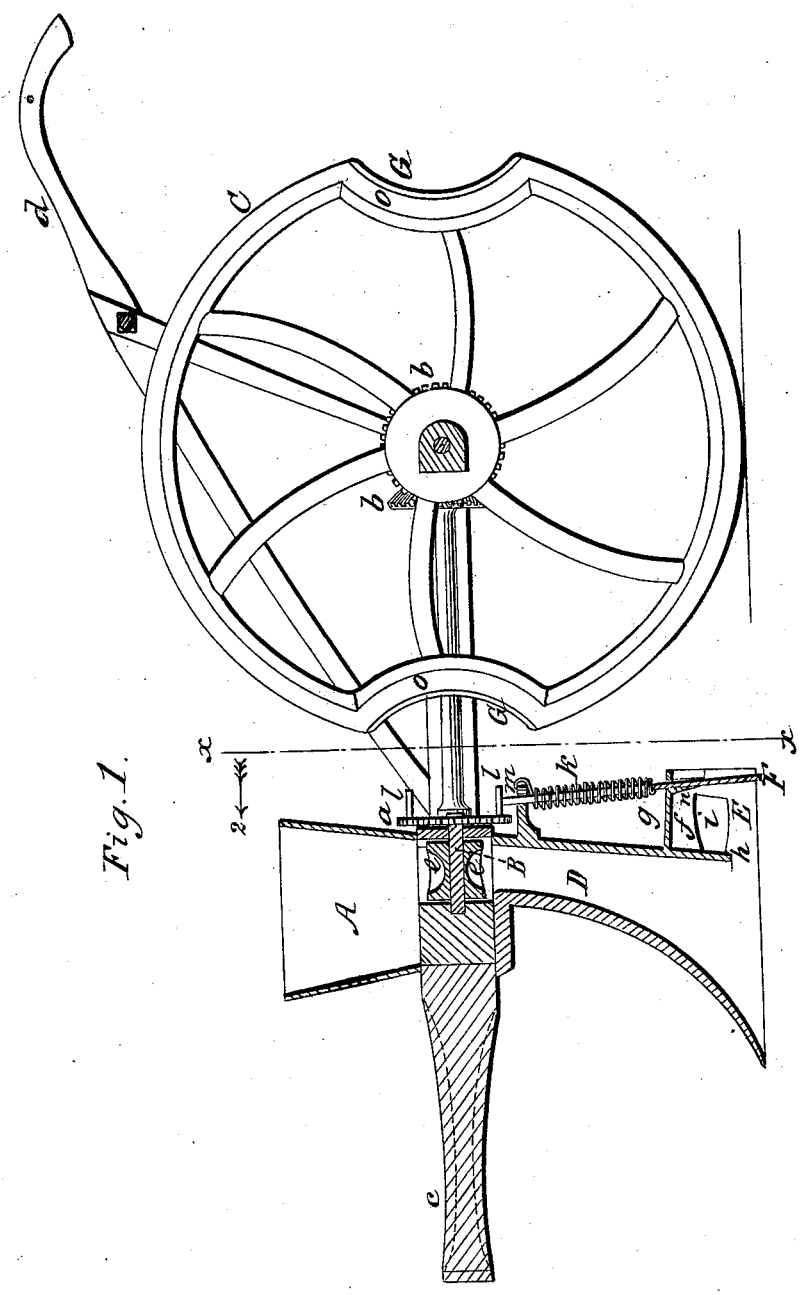

A. FRANKLIN.
Seed-Planter.

No. 17,786.

2 Sheets—Sheet 1.

Patented July 14, 1857.

A. FRANKLIN.
Seed-Planter.
No. 17,786.
Patented July 14, 1857
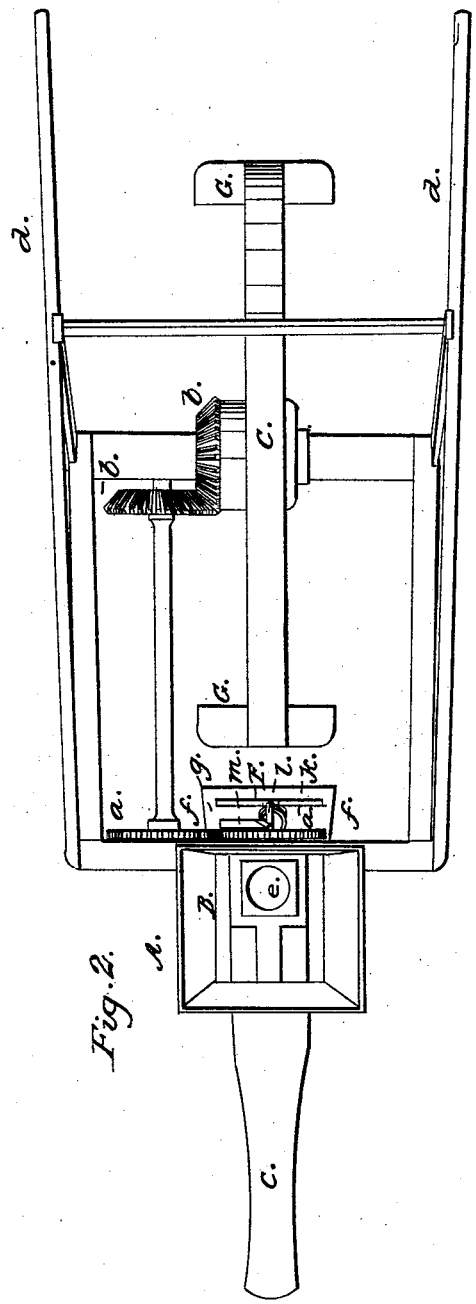
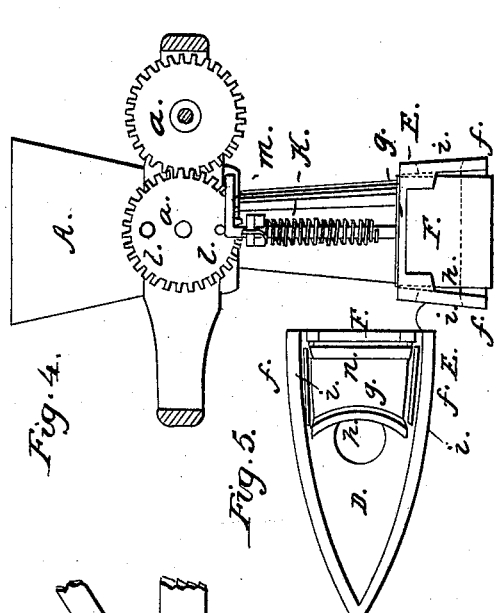
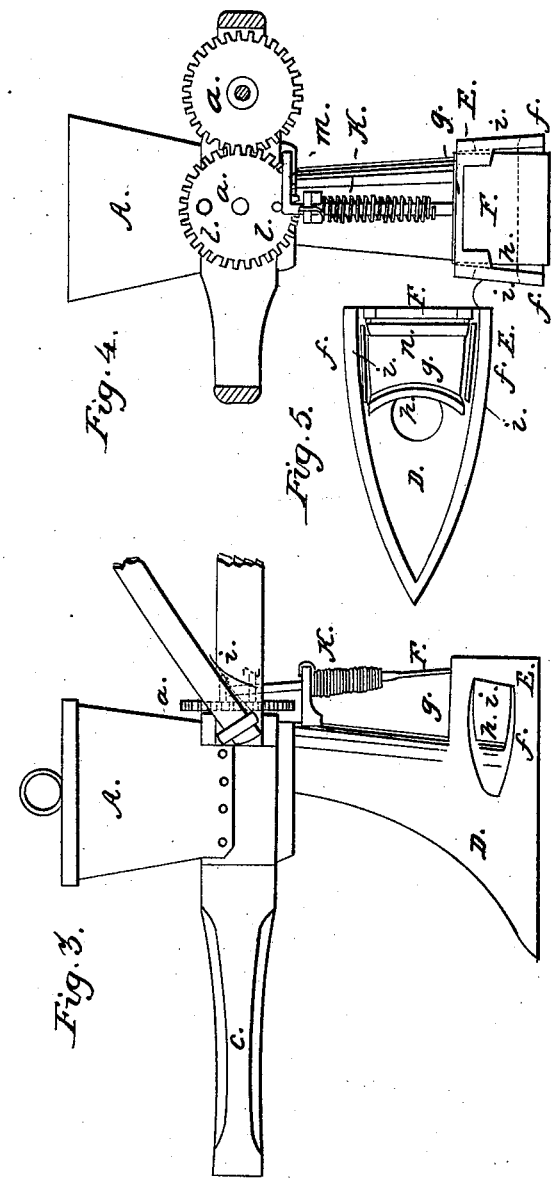
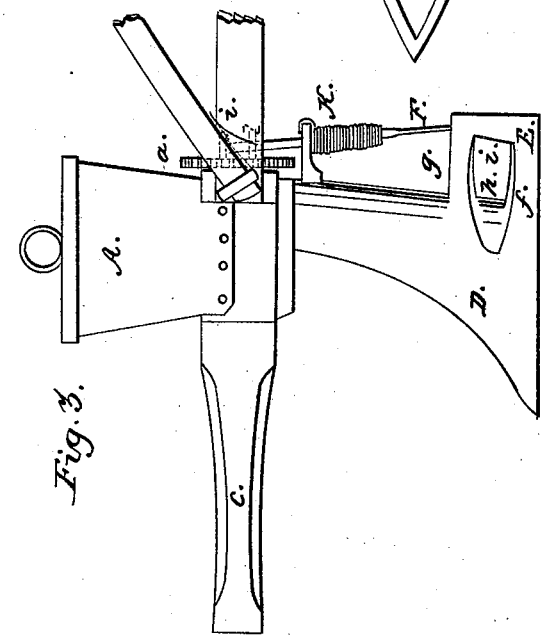

UNITED STATES PATENT OFFICE.

ALVIN FRANKLIN, OF GENOA CROSS ROADS, OHIO.

IMPROVEMENT IN CORN-PLANTERS.

Specification forming part of Letters Patent No. 17,786, dated July 14, 1857.

*To all whom it may concern:*

Be it known that I, ALVIN FRANKLIN, of Genoa Cross Roads, in the county of Delaware and State of Ohio, have invented a certain new and useful Improvement in Corn-Planters, of which the following is a full, clear, and exact description, reference being had to the accompanying drawings, which form part of this specification, and in which—

Figure 1 represents a longitudinal vertical section of the machine; Fig. 2, a top view or plan; Fig. 3, a side elevation of the front portion of the machine only; Fig. 4, a transverse vertical section taken as indicated by the line $x\ x$ in Fig. 1, and looking in direction of the arrow $z$; and Fig. 5, an inverted plan of the plow, plow-box, and hoe forming part of the machine.

In the machine represented in the accompanying drawings many of the devices included in it are common to other corn and seed or grain planting machines, such as a seed box or hopper, A, seed-dropping cylinder or valve, B, operated by spur-gearing $a\ a$, and bevel-gearing $b\ b$, from or by the main running or driving wheel C of the machine in the rear of it, so as to cause the corn to be dropped in regular quantities and at regular intervals from the hopper A, down the hollow plow D, into the furrow formed by said plow, in a manner well known, for the purpose of planting the corn equally and at regular distances apart, leading-beam $c$, guiding-handles $d\ d$, &c.

The dropping-cylinder B, arranged in the bottom of the seed-box, may be of the ordinary revolving kind, and is here shown as provided with two delivery-apertures, $e\ e$, whereby two deposits of corn are made each revolution of the cylinder; but of course this proportion may be varied, as may also the form of the dropping device, &c.

This machine, it should here be observed, is specially adapted to planting in hills. In machines of this class numerous arrangements have been resorted to for covering automatically the corn as it has been dropped in the furrow. The main or driving wheel in the rear has had a groove formed round its periphery to shape and cover the furrow, has been armed with variously-shaped studs or projections, and been furnished with markers to denote the hills in which the corn has been planted. Covering wings or strips, too, have been used, and hoes and like devices to work in connection with the planting portion of the machine; but all of these differ essentially from the arrangement I adopt for covering the corn in perfect and clearly-defined hills, and fail to accomplish the same in as perfect or like manner.

At the bottom of the hollow plow D, in the rear of it, is a plow-box or plow-box extension, E, made open at the bottom and back, and having sides $f\ f$, a top or cover, $g$, and a front piece or partition, $h$. The sides $f\ f$ have slots or openings $i\ i$ made in them, and the front piece, $h$, which divides the plow-box extension from the plow proper, is made of less depth (so as to leave an open communication beneath) than the plow-box.

In the rear of the plow-box extension E, working through a slot or opening in its top, is a rising and falling hoe, F, which may be operated by a spring, $k$, round the stem of the hoe, and by studs $l\ l$ on the wheel $a$ of the dropping-cylinder, acting upon or against a crook, $m$, of the hoe-stem, as hereinafter described. The plow-box extension has a knife or scraper, $n$, projecting from its cover $g$ on the interior, and arranged to form close or nearly close contact with the face of the hoe F.

The main running or driving wheel C has the rotundity of its periphery interrupted at suitable distances apart by "hollows" $o\ o$, which are fitted or provided with broad segmental sheths or hill-formers G G, that operate in connection with the plow-box extension and hoe as follows: Supposing the machine to be in motion and the dropping-cylinder B depositing corn in the furrow at regular distances apart, the loose earth or dirt at the sides of the furrow passes in through the side openings, $i\ i$, of the plow-box extension to cover the corn, and at or after each deposit of the corn the hoe F is depressed by one of the studs $l$ on the wheel $a$ acting against the crook $m$ of the hoe-stem to the position it is represented as occupying in Fig. 1 of the drawings, in which position said hoe, as the machine moves forward, heaps up the loose earth or dirt over the corn—that is, the loose earth entering the side openings, $i\ i$, and which is prevented from passing out behind by said hoe when in its depressed position—and the hoe further scraping up loose earth or dirt from the bottom of the furrow. After the corn is thus covered and the acting stud *l* has passed the crook *m* the hoe is shot upward by the spring *k* to the position represented in Fig. 3 of the drawings, in which position it remains till the next stud *l* comes round and depresses it to form another heap of loose earth or dirt over the next deposit of corn. The partition *h* in front of the plow-box extension prevents the hoe from carrying the dirt too far forward before the corn has fairly dropped, thus giving the corn room to reach the bottom of the furrow before the hoe acts. The cover *g* of said plow-box prevents lumps and stones from getting in before the hoe, and the knife or scraper *n* cleans the hoe from dirt and grass-roots that may adhere to it every time the hoe springs, thus keeping the hoe clean at all times. By this action of the hoe and plow-box extension combined it will be observed that the loose earth is only piled up over the corn in loose heaps, the interior of the sides of the hoe-box extension giving a side configuration to these heaps in the direction of the machine's travel. To give a transverse configuration to these heaps, and to form them into perfect hills over the corn, the hill-formers G G are brought into requisition, they being so pitched in the rims of the driving-wheel as to strike each heap in the right place over the corn, flatten or round said heaps into clear well-defined hills, (rendering markers useless,) and crushing all lumps in their office of smoothing or shaping the hills.

What I claim as new and useful herein, and desire to secure by Letters Patent, is—

1. The combination of the plow-box extension E and hoe F in the rear of the planting tube or passage, for operation together and with an intermittent corn-discharge or seed-depositing arrangement, substantially as specified, for the purpose set forth.

2. Providing the plow-box extension E with a knife or scraper, *n*, arranged in relation to the hoe, for the purpose of clearing the latter in its back spring or stroke, as shown and described.

In testimony whereof I have hereunto subscribed my name.

ALVIN FRANKLIN.

Witnesses:
J. B. INGALLS,
E. B. INGALLS.